(12) United States Patent
Di Sena et al.

(10) Patent No.: US 7,457,909 B2
(45) Date of Patent: Nov. 25, 2008

(54) CONTROLLING OPERATION OF FLASH MEMORIES

(76) Inventors: Angelo Di Sena, Via 9 Maggio, 31, Castello di Cisterna (IT) 80030; Agata Intini, Via Gaetano Donizetti, 4, Putignano (IT) 70017

( * ) Notice: Subject to any disclaimer, the term of this patent is extended or adjusted under 35 U.S.C. 154(b) by 358 days.

(21) Appl. No.: 11/036,179

(22) Filed: Jan. 14, 2005

(65) Prior Publication Data
US 2006/0161723 A1 Jul. 20, 2006

(51) Int. Cl.
*G06F 12/00* (2006.01)
(52) U.S. Cl. ........... 711/103; 711/203; 711/170; 707/3; 707/101; 707/102
(58) Field of Classification Search ............ 711/103, 711/203, 170; 707/3, 101, 102
See application file for complete search history.

(56) References Cited

U.S. PATENT DOCUMENTS

| | | | |
|---|---|---|---|
| 5,535,369 A | 7/1996 | Wells et al. | |
| 5,634,050 A | 5/1997 | Krueger et al. | |
| 5,740,395 A | 4/1998 | Wells et al. | |
| 5,832,493 A * | 11/1998 | Marshall et al. | 707/101 |
| 5,867,641 A | 2/1999 | Jenett | |
| 5,930,815 A | 7/1999 | Estakhri et al. | |
| 6,374,324 B2 | 4/2002 | Han | |
| 6,411,546 B1 * | 6/2002 | Estakhri et al. | 365/185.11 |
| 6,581,132 B1 | 6/2003 | Kakinuma et al. | |
| 6,594,183 B1 | 7/2003 | Lofgren et al. | |
| 7,057,942 B2 * | 6/2006 | Suda et al. | 365/189.01 |
| 2001/0023472 A1* | 9/2001 | Kubushiro et al. | 711/103 |
| 2003/0088812 A1* | 5/2003 | Lasser | 714/42 |
| 2004/0098428 A1* | 5/2004 | Schulze et al. | 707/205 |
| 2004/0199712 A1* | 10/2004 | Garritsen et al. | 711/103 |
| 2006/0282644 A1* | 12/2006 | Wong | 711/206 |

* cited by examiner

*Primary Examiner*—Hong Kim (57) ABSTRACT

A method controls write/erase operations in a memory device, such as a NAND flash memory. The method includes dividing the memory device in physical blocks, wherein each physical block is comprised of a number of pages; considering the memory device as comprising consecutive virtual blocks, each virtual block including consecutive sectors; associating to each virtual block a virtual block number; selecting the size of the virtual blocks equal to a multiple of the size of the physical blocks; and creating a virtual-to-physical mapping table having entries. Each entry in the mapping table stores a pointer to a root node of a tree structure that links logically a set of physical blocks in the memory device.

35 Claims, 5 Drawing Sheets

CONTROLLING OPERATION OF FLASH MEMORIES

BACKGROUND OF THE INVENTION

1. Field of the Invention

The invention relates to techniques for controlling operation of memory devices, and was developed by paying specific attention to the possible application in NAND flash memories that store information in NAND cells.

2. Description of the Related Art

In embedded operating systems, file systems read and write data in small blocks of a hard disk called "sectors", typically of the size of 512 bytes.

In some embedded systems, rather than in the hard disk, the data are saved in NAND flash memories.

The designation "NAND" derives form the specific matrix-like organization (specifically related to the bit lines) of connecting the floating gate cells of the same string (typically 11 or 32) in series (between a drain switch—connected to the bit line—and a source switch). This implies a specific truth table for reading. In fact for reading a given cell in the string (the other strings being de-selected by the corresponding drain selector) it is necessary to activate all the other word lines in order to avoid that any cell that is turned off in parallel to the cell addressed may open the circuit.

This has to be construed in respect of NOR memory cells, where each single cell has a drain terminal directly connected to the bit line, whereby all the cells coming down to the same bit line are addressed in parallel towards the source terminal at ground voltage (and selected by activating only the corresponding word line, with all the other word lines to ground, in order to de-activate non-addressed cells.

By considering the case of two cells only (A addressed and B non-addressed) in a bit line or in a string the corresponding truth table is:

NOR:

| A | B | OR | NOR | |
|---|---|----|-----|---|
| 0 | 0 | 0  | 1   | useful for reading |
| 1 | 0 | 1  | 0   | useful for reading |
| 0 | 1 | 1  | 0   | |
| 1 | 1 | 1  | 0   | |

There one sees that for reading the cell A it is necessary to turn out (0) the B cell(s) connected in parallel thereto; this is effected by keeping to ground the word lines for B.

In fact, if the cell B absorbs current (1), it is not possible to ascertain whether the cell A is absorbing current (1) or not (0).

NAND:

| A | B | AND | NAND | |
|---|---|-----|------|---|
| 0 | 0 | 0   | 1    | |
| 1 | 0 | 0   | 1    | |
| 0 | 1 | 0   | 1    | useful for reading |
| 1 | 1 | 1   | 0    | useful for reading |

There one sees that for reading the cell A it is necessary to turn on (1) the B cell(s) connected in series thereto; this is effected by "raising" the word lines for B above the maximum threshold voltage.

In fact, if the cell B does not absorb any current (0), it is not possible to ascertain whether the cell A is absorbing current (1) or not (0) because otherwise the circuit would be interrupted.

Unlike hard disks, NAND flash memories can only be programmed one page at a time and they can only be re-programmed after the entire block containing the page to be re-programmed, has been erased.

In order to render less evident the difference in the physical organization of the various memory devices, a so-called Translation Layer can be used between the file system and the storage media to mask the differences. Several Translation Layer solutions simulate the rewrite operation of a page by writing new data updates in different locations, keeping track of the last (valid) page rewrite operation (e.g. document U.S. Pat. No. 5,740,395).

Many solutions use a Translation Table that associates virtual blocks to physical blocks in a flash memory (e.g. documents U.S. Pat. Nos. 6,374,324; 5,634,050; 5,930,815; 6,581,132; 6,594,183). Generally, each entry of the Translation Table contains a Physical Block Number. Such table is built at device formatting time, so the translation between Virtual Blocks (VB) and Physical Blocks (PB) is defined.

Other prior art methods, simulate a page rewrite operation in a virtual block by performing "writes" in a different block. Each block involved in this operation contains the information (link information) necessary to reach any other block involved (U.S. Pat. Nos. 6,374,324; 5,930,815). With such a system, each sector read operation involves multiple sector read operations. In fact, each previous (invalid) "writes", of searched sector, must be read in order to reach the last (valid) "write" of requested sector.

This approach requires repeatedly reading the link information for each read/write operation. Therefore, read/write throughput is adversely affected by these additional operations. Specifically, the method described may read all the link information at device power on. After that, the link information can be read from the RAM and the read/write throughput is improved. This method writes the position of the new page version in the spare area of the old version of a page (e.g. U.S. Pat. Nos. 6,374,324; 5,930,815). In this way, reading a page requires reading the spare area of each page that represents a previous version thereof.

Several techniques write a sort of header information in each block (e.g. U.S. Pat. Nos. 5,867,641; 5,634,050; 5,535,369). Typically, this header is written when the block is written for the first time. The header contains the Virtual Block Number of the Virtual Block to which it refers and other useful information. These techniques write the header in the first spare area at device formatting time or when the block is used for the first time. In both cases, the spare area of the first page is used even if the first page is not written yet. Therefore, the first spare area will be written once and (due to NAND flash characteristics) only another write operation will be permitted in that area.

Still other methods write in the spare area of a page to indicate the status of the page itself; multiple spare writes are thus required to store page status change.

BRIEF SUMMARY OF THE INVENTION

One embodiment of the invention provides an improved arrangement for performing read/write operations in NAND flash devices while overcoming the disadvantages of the prior art arrangements described in the foregoing.

One embodiment of the invention is directed to a method of controlling write/erase operations in a memory device. The method includes:

dividing the memory device in physical blocks each comprised of a number of pages;

considering the memory device as including consecutive virtual blocks, each including consecutive sectors;

associating with each virtual block a virtual block number;

selecting a size of the virtual blocks equal to a multiple of a size of the physical blocks; and creating a virtual-to-physical mapping table having entries that each store a pointer to a root node of a tree structure that links logically a set of physical blocks in the memory device.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

The solution described herein is based on the use of a virtual-to-physical mapping table. The virtual-to-physical mapping table stores, for each entry, a pointer to a tree structure instead of a physical block number. Each tree structure links logically a set of physical blocks in the flash device. All the physical blocks indicated in the tree data structure refer to the same virtual block.

The solution described-herein stores information used to link the blocks that are part of the tree data structure. Such information is stored in spare area of the first page of each block of the tree.

Additionally, the solution permits to write updates of a page in a different position of the same physical block. In particular, the solution writes the new version of a page in a defined position that can be calculated starting from page position in a virtual block. Therefore no need exists of reading the spare area of any pages to learn the new position of a page.

This feature permits to write in the spare area of each page only once. This is because header information is written when the block is written for the first time and the first page that has to be written in the block is always stored in the first page of the block.

This technique dispenses with multiple write operations in the spare area (without erasing the block first), reducing the error occurrence.

This method allows the user to define a number of blocks in a flash memory that are considered accessible by the external file system.

In this way the NAND device can be considered as an area of consecutive blocks. These blocks are referred as virtual blocks (VB). Each virtual block is composed by consecutive sectors, and each sector is, typically, of size equal to 512 bytes, although other sector sizes could be employed. Each virtual block has associated a virtual block number (VBN), ranging from zero to (number of virtual blocks −1).

Alternatively, the NAND device is divided in physical blocks (PB) with each physical block composed by a certain number of pages. A page contains a main area and a spare area. For example, in 512 Mbit NAND devices the main area is 512 bytes and the spare area is 16 bytes, while in 1 Gbit NAND devices the main area is 2048 bytes and the spare area is 64 bytes. Each virtual block has a size that is a multiple of the size of a physical block.

This solution permits access to NAND devices by managing virtual blocks. Virtual blocks make it possible to simulate rewrite operations of the same sector in a physical block without erasing the physical blocks between them.

Page write operations in the same virtual block generate a tree data structure. A tree data structure is a logical structure, preferably stored in a RAM, which links different physical blocks in a flash device.

Figure 1:
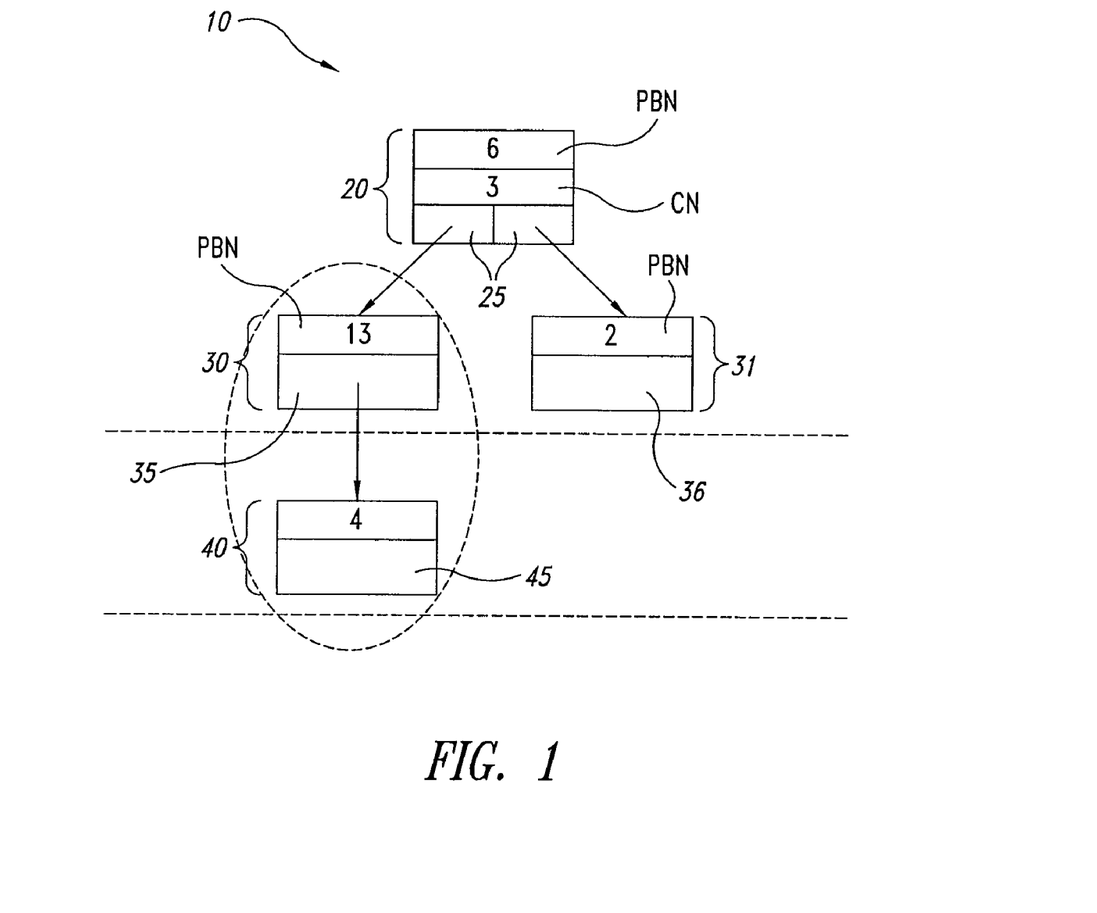
FIG. 1 shows an example of a tree data structure stored in a random access memory (RAM)

FIG. 1 shows an example of a tree data structure 10 stored in a RAM. The tree structure 10 is comprised of a plurality of nodes 20, 30, 31, and 40. The node 20 is called the root node, while the nodes 30, 31 and 40 are called the child nodes. The node 30 is also called an intermediate node and the nodes 31 and 40 are called leaf nodes. A tree could have a left branch and right branch. The child nodes can be right child (if present in right branch) or left child (if present in left branch). The root node 20 comprises at least a first field PBN containing the physical block number, a second field CN containing the child number (the number of child nodes in the tree), and two fields 25 containing pointers to the respective child nodes 30, 31. Each child node 30, 31, 40 comprises at least a first field PBN containing the physical block number and a second field 35, 36, 45 containing a pointer to a child node, if any.

The following description will refer, by way of example, to NAND devices with physical blocks of 32 pages where each page is 528 bytes (512 bytes of main area, 16 bytes of spare area). Using the solution with devices having other page sizes, e.g. 2112 bytes, is a simple extension of the arrangement shown.

Generally, the root node of the tree structure contains:
the physical block number of the physical block used as root;
a pointer to the left child node;
a pointer to the right child node; and
the child number of child nodes currently present in the tree.

Each child node contains:
the physical block number of the physical block to which the node is associated; and
a pointer to the next child node in the tree.

In the following, "root block" will indicate a physical block associated with the root node, while "child block" will indicate a physical block associated with the child node.

Successive write operations of the same sectors in a virtual block generate child nodes.

Figure 2:
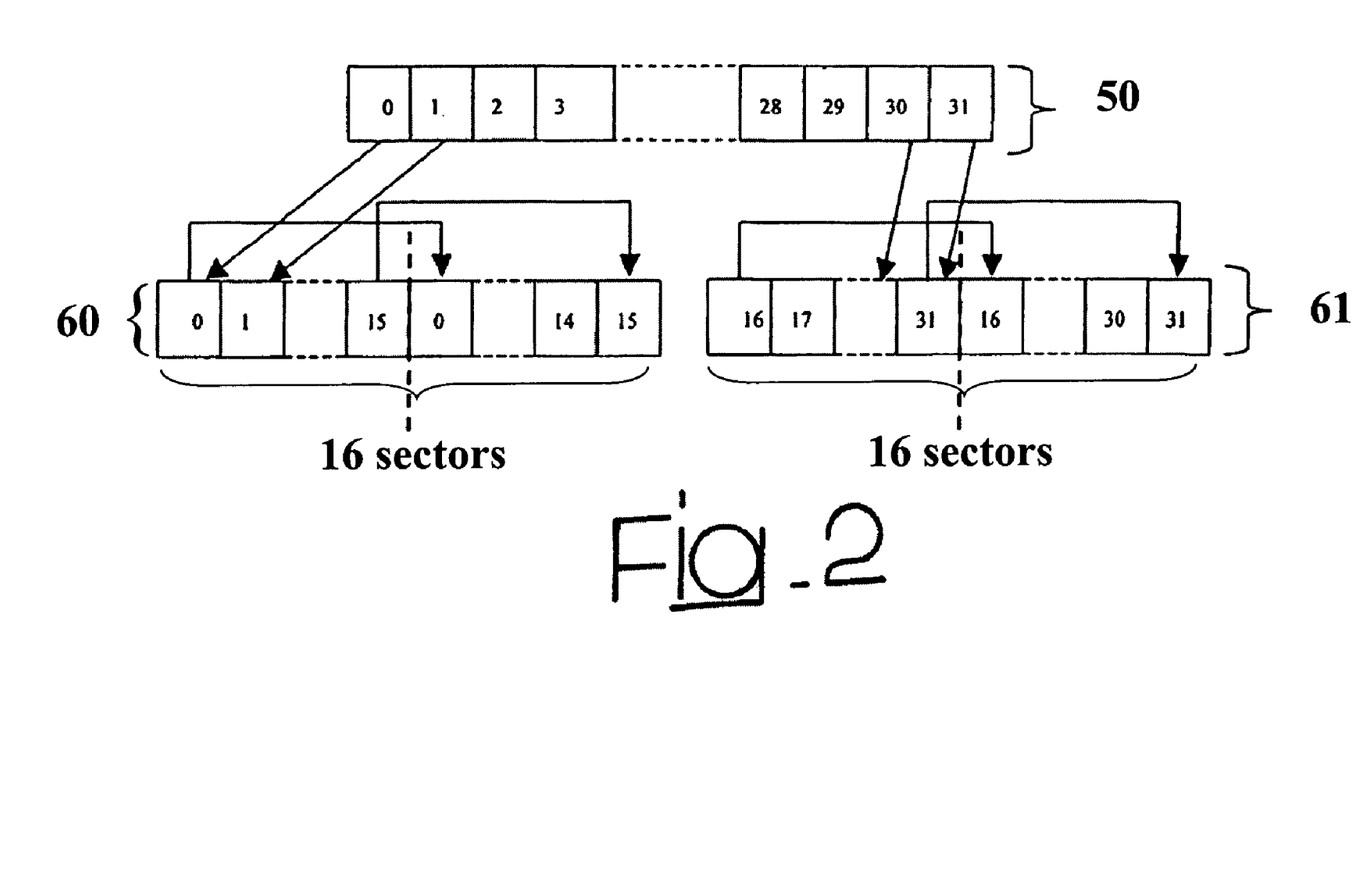
FIG. 2 shows an example of two child block departing from a root block.

FIG. 2 illustrates a root block 50 and child blocks 60 and 61 that respectively correspond to the root node 20 and the child nodes 30 and 31 of FIG. 1. The left child block 60 contains the rewrites of the first sixteen sectors of a virtual block; the right child block 61 contains the rewrites of the second sixteen sectors of a virtual block.

As shown in FIG. 2, each child block can contain a maximum of two rewrites of a sector (the first sixteen sectors or the second sixteen sectors).

Specifically, each child block can be considered as divided in two parts. In that way, the rewrite of sector 'x' in the physical block will be in position 'x' or in position 'x+16' of the left child block, when x is between 0 and 15; in position 'x−16' or in position 'x' of the right child block, when x is between 16 and 31.

When no space is available in a child block, a new child block is created selecting the free physical block in the NAND flash device with the minimum number of erase operations performed on it. A new child node is created in the RAM.

The new child node will be linked to the previous node of the same branch. Therefore, an entire tree will be related to a single virtual block, representing the "history" of write operations performed in a virtual block.

By "traversing" a tree, it is possible to read valid sectors (the last written) contained in it.

To rebuild the tree in the RAM memory at device power on, linking information is stored in root blocks and child blocks in the flash device. The spare area of the first page of each block is used to link correctly the physical block of each tree.

Each physical block belonging to a defined tree stores the virtual block number of the virtual block represented by the tree.

In addition, each physical block belonging to a tree contains information about its position in the tree itself. Such information is used by the system to reconstruct the trees at power on by recognizing, through it, the roots and the child nodes.

Linking information is stored in the spare area of the first page of each physical block.

Specifically, the spare area of each page has a dimension of sixteen bytes.

Preferably, the spare area is used as follows:
the first, second, and third bytes include the error correction code;
the fourth byte includes the position of the tree; it indicates the tree level and the child position (left or right). It is saved only in the first spare area of each physical block. The most significant bit is zero for left leaf blocks and one for right leaf blocks. The seventh least significant bits represent the level of the child block. For each "branch" of a tree, the levels of the child blocks grow sequentially, the first child block in the branch has level one;
the fifth byte includes the page status; it indicates if a page is:
WRITTEN (the less significant bit is one);
EMPTY (all the bits are set to one, the others are zeros);
the sixth byte includes the Block Status; it indicates if a block is;
GOOD (all the bits are set to one);
BAD (some bit is set to zero). It is saved only in the first spare area of each physical block;
the seventh, and eighth bytes include the virtual block number; it is saved only in the first spare area of each physical block;
the ninth byte includes the swap page; it indicates the sector number in case of swap;
the tenth byte is a copy of the page status byte;
the eleventh byte includes the root counter byte;
the twelfth, thirteenth, fourteenth, fifteenth, and sixteenth bytes are not used.

The system manages a virtual to physical mapping table. It is a table with an entry for each virtual block.

Initially, when the flash is not written, each entry contains a pointer to NULL.

When write operations occur, tree data structures are created following the method previously defined. A tree is created for each virtual block that is written. Each entry in the virtual-to-physical mapping table will contain the pointer to the root node of the tree associated with the relative virtual block (e.g. the entry at position i will contain the pointer to the root of the tree associated to the i-th virtual block).

Figure 3:
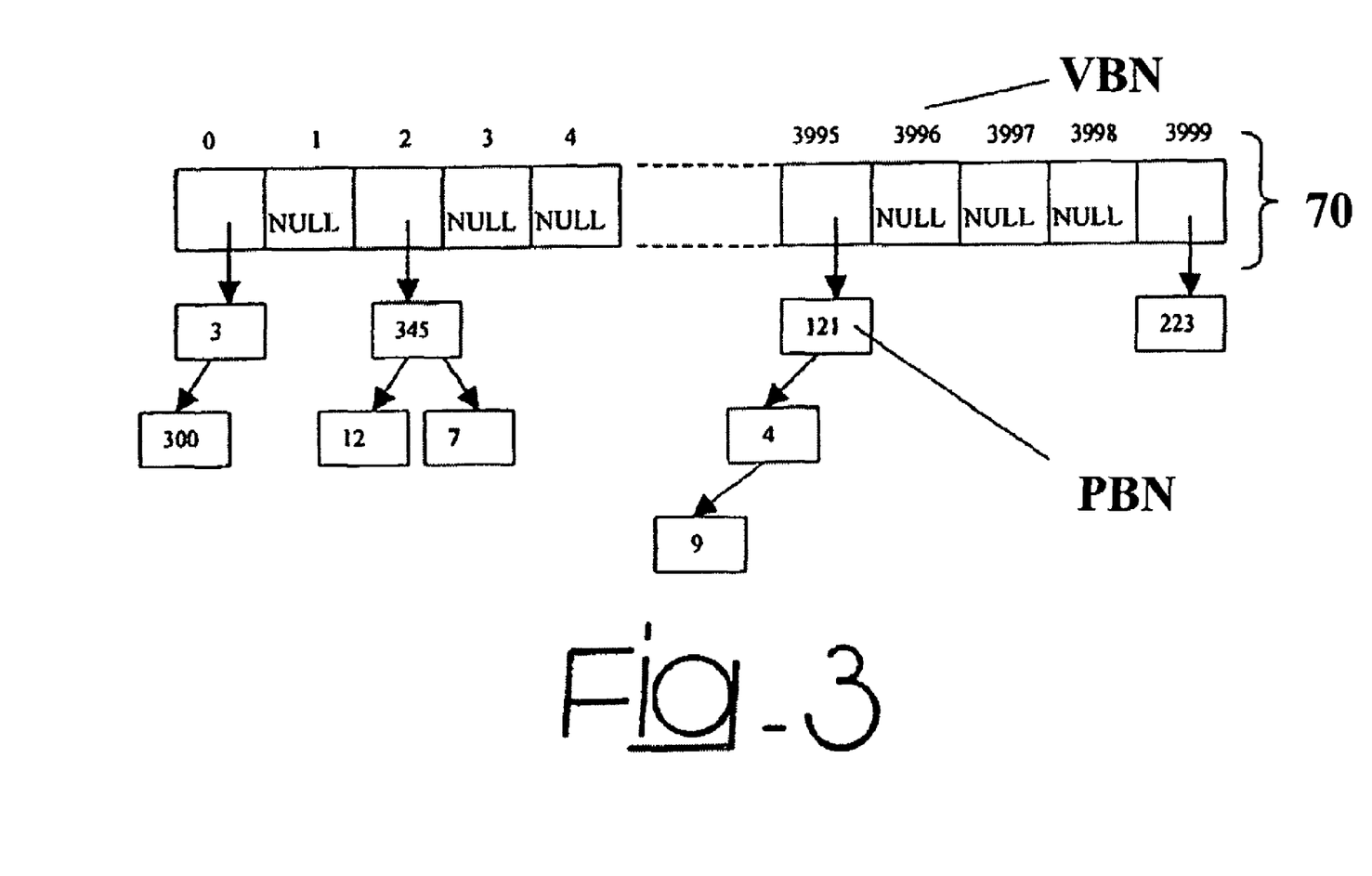
FIG. 3 shows an example of tree data structure with 4000 virtual blocks.

FIG. 3 shows an example of a virtual-to-physical mapping table 70 where 4000 virtual blocks are defined. Only four virtual blocks have been used (0, 2, 3995, 3999). In the example considered, multiple writes in these blocks caused writes in nine physical blocks. Their physical block numbers are indicated in the nodes of the trees.

To rebuild the tree data structures at device power on, the system has to read the spare area of the first page of each block.

Therefore, the information necessary for tree rebuilding is stored in the first spare area. Additionally, the system does not write more than one time in each spare area (without performing a physical block erase first).

To accomplish these two features, the system uses a specific technique during the write operations.

In fact, when a page write operation occurs for the first time in a physical block, that operation is performed in the page zero of the physical block.

If the page to write refers to a different position, then the real position is written in the swap page byte of the spare area.

When a write of page zero subsequently occurs, this will be in the position left free from the page that is stored in position zero. To retrieve the free position where writing may occur, the swap page byte is read.

Figure 4:
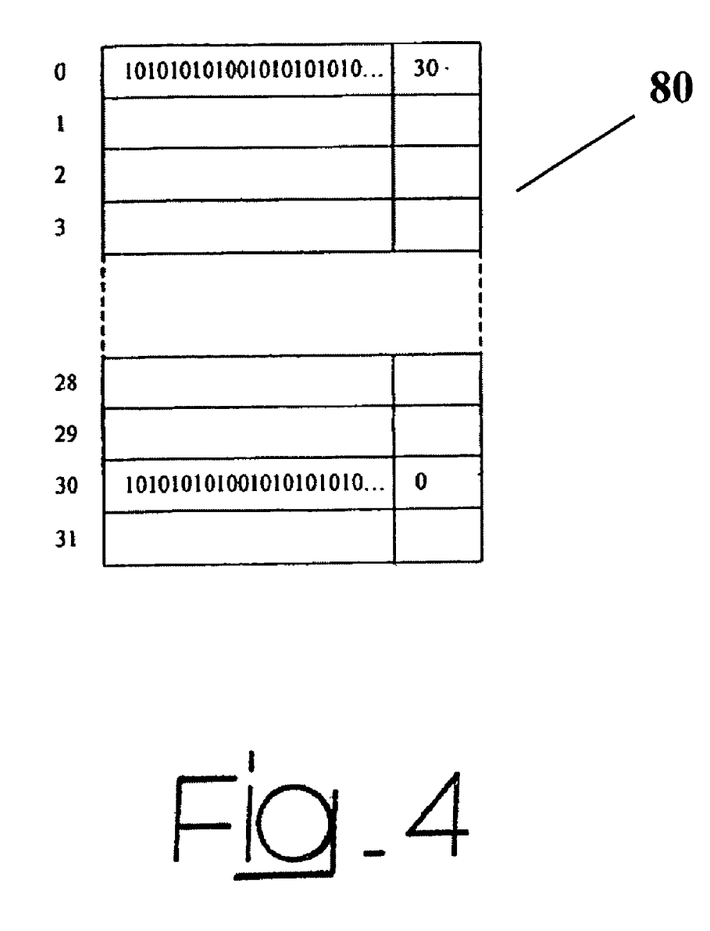
FIG. 4 shows an example of a physical block having a page zero in which are written the data of page 30.

FIG. 4 shows a physical block 80 where the data of page 30 are written at page zero. The swap page byte in the spare area indicates that one has to deal with a swap page and that the data of page zero are written in page of position 30.

In addition, the page 30 has the swap page byte set to zero.

This technique makes it unnecessary to perform multiple writes in the spare area (without erasing the block first), thus reducing the possibility of error and reducing the boot time of the device. All the data structure can be reconstructed reading only one spare area for each block.

The structures in the RAM are used in order to reduce the program overhead to write pages in the flash memory. Write operations reaching the system indicate the virtual block number and the sector number where to write. Through the virtual block number the virtual-to-physical mapping table is accessed at the right virtual block number position.

If the pointer in the table is set to NULL, then write operations never occur in this virtual block number. In this case a new free block is chosen from the flash memory, the page is written in the zero position of this block, by setting the swap page as previously indicated. The virtual block number and the tree position are written in spare area of the page.

A new root node is created in the RAM, with the physical block number field set to the physical block number of the chosen block.

Finally, the entry in the virtual-to-physical mapping table at the position of the virtual block number is set to a pointer to the root node created.

Each subsequent write in the same virtual block is performed following the scheme indicated in the foregoing.

Of course, the tree in the RAM is used to determine the right Physical block where to write, while the page status byte in each spare portion is used to determine if a page is free for writing.

The structures in the RAM are used in order to reduce the read overhead in performing a correct page read in the flash memory.

Read operations reach the system by indicating the virtual block number and the sector number where to read.

Through the virtual block number the virtual-to-physical mapping table is accessed at that position.

The tree is used to select the right physical block where to read. The valid page in a tree is the last one which may written into it (in the position defined by the algorithm). So the tree is traversed until the valid page written is read. The state of the page can be depicted by the status page byte.

Naturally, the zero page of each physical block encountered during traversing is read first, in order to know if the page searched has been swapped.

The user can define a tree threshold. It is the maximum number of levels of a tree.

As explained previously, successive write operations in a virtual block cause the tree to grow. When a defined threshold is reached for a tree, no subsequent child node creation steps are allowed. Therefore the tree has to be "cleared". For this task a new free physical block is selected where to write all the valid pages contained in the tree.

Subsequently, all the valid pages are retrieved from the tree (using the "read-in-flash" algorithm) and copied in the new physical block selected.

A new root node is created with the new root block information and substituted for the tree involved in this operation. Such a tree is erased from the RAM and the physical blocks belonging to the tree are erased in the flash memory, starting from the nodes that become again free.

The tree erase operation is a slow task because it involves many block erase operations. Power loss between the block erases (after the valid pages recopy) may leave two root blocks linked to the same virtual block. At power-on this could cause erroneous tree building.

To overcome this problem, when a new root block is created, the root counter byte is set to:

zero, if is the first time that this root block is created; or the previous root counter plus one, if the root is generated from a tree erasing operation.

In that way, if at power-on two root nodes with the same virtual block number are retrieved, only the block with the higher root counter is considered valid, the other is erased.

In addition, when this case occurs, all the nodes belonging to the tree with the virtual block number involved are erased. This is because they are certainly not valid since any valid page in them has been already re-copied in the new root.

Figure 5:
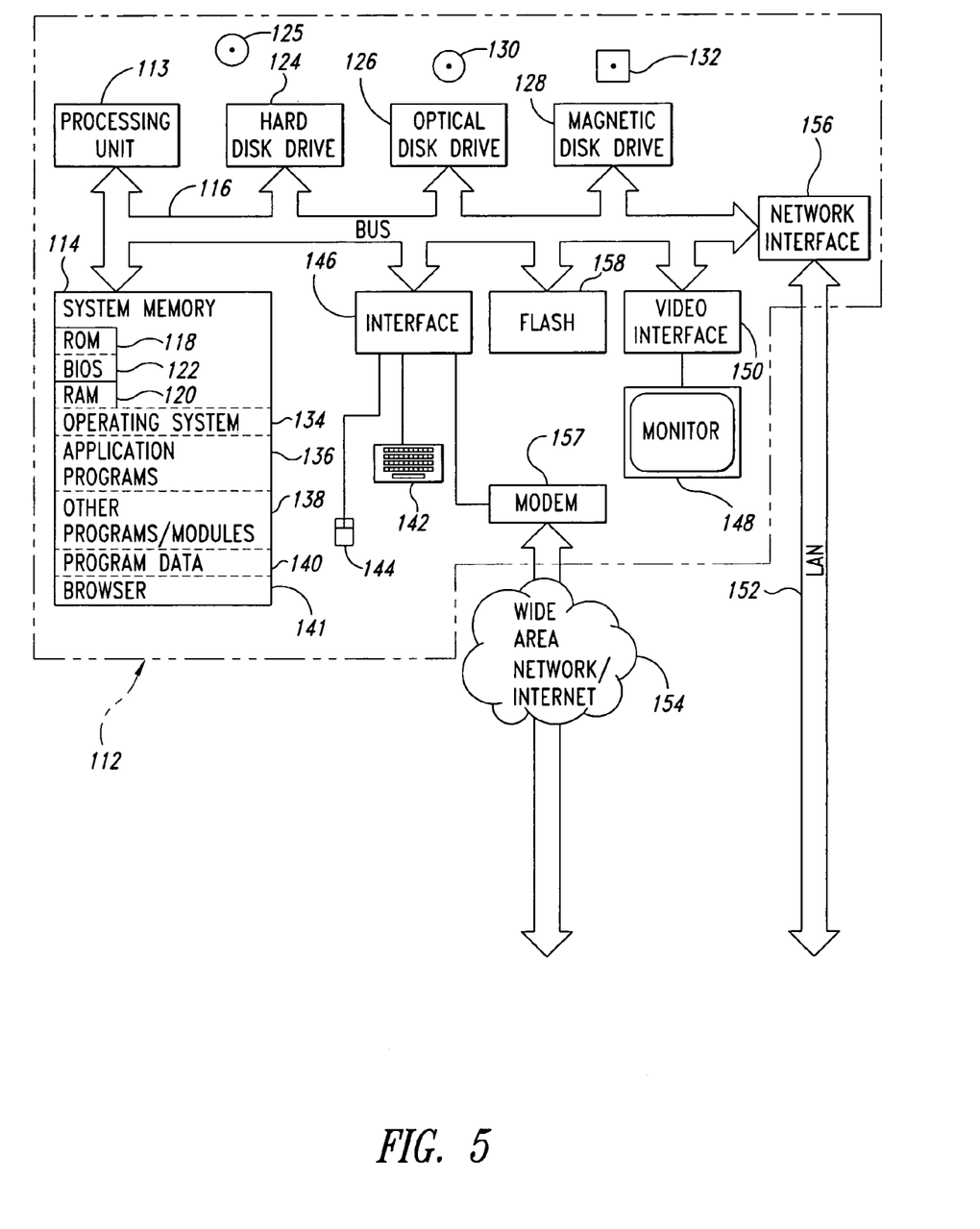
FIG. 5 is a block diagram of a computer system for implementing one embodiment of the present invention.

Those skilled in the art will recognize that the method described above may be implemented in a general purpose computer system. FIG. 5 and the following discussion provide a brief, general description of a suitable computing environment in which the invention may be implemented. Although not required, at least one embodiment of the invention can be implemented in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 5, a personal computer referred to herein as a computing system 112 includes a processing unit 113, a system memory 114 and a system bus 116 that couples various system components including the system memory 114 to the processing unit 113. The processing unit 113 may be any logical processing unit, such as one or more central processing units (CPUs), digital signal processors (DSPs), application-specific integrated circuits (ASIC), etc. Unless described otherwise, the construction and operation of the various blocks shown in FIG. 5 are of conventional design. As a result, such blocks need not be described in further detail herein, as they will be understood by those skilled in the relevant art.

The system bus 116 can employ any known bus structures or architectures, including a memory bus with memory controller, a peripheral bus, and/or a local bus. The system memory 114 includes read-only memory ("ROM") 118 and random access memory ("RAM") 120. A basic input/output system ("BIOS") 122, which can form part of the ROM 118, contains basic routines that help transfer information between elements within the computing system 112, such as during startup.

The computing system 112 also includes one or more spinning media memories such as a hard disk drive 124 for reading from and writing to a hard disk 125, and an optical disk drive 126 and a magnetic disk drive 128 for reading from and writing to removable optical disks 130 and magnetic disks 132, respectively. The optical disk 130 can be a CD-ROM, while the magnetic disk 132 can be a magnetic floppy disk or diskette. The hard disk drive 124, optical disk drive 126 and magnetic disk drive 128 communicate with the processing unit 113 via the bus 116. The hard disk drive 124, optical disk drive 126 and magnetic disk drive 128 may include interfaces or controllers coupled between such drives and the bus 116, as is known by those skilled in the relevant art, for example via an IDE (i.e., Integrated Drive Electronics) interface. The drives 124, 126 and 128, and their associated computer-readable media, provide nonvolatile storage of computer-readable instructions, data structures, program modules and other data for the computing system 112. Although the depicted computing system 112 employs hard disk 125, optical disk 130 and magnetic disk 132, those skilled in the relevant art will appreciate that other types of spinning media memory computer-readable media may be employed, such as, digital video disks ("DVD"), Bernoulli cartridges, etc.

Program modules can be stored in the system memory 114, such as an operating system 134, one or more application programs 136, other programs or modules 138, and program data 140. The system memory 14 also includes a browser 141 for permitting the computing system 112 to access and exchange data with sources such as websites of the Internet, corporate intranets, or other networks, as well as other server applications on server computers. The browser 141 is markup language based, such as hypertext markup language ("HTML"), and operate with markup languages that use syntactically delimited characters added to the data of a document to represent the structure of the document.

While shown in FIG. 5 as being stored in the system memory, the operating system 134, application programs 136, other program modules 138, program data 140 and browser 141 can be stored on the hard disk 125 of the hard disk drive 24, the optical disk 130 and the optical disk drive 126 and/or the magnetic disk 132 of the magnetic disk drive 128. A user can enter commands and information to the computing system 112 through input devices such as a keyboard 142 and a pointing device such as a mouse 144. Other input devices can include a microphone, joystick, game pad, scanner, etc. These and other input devices are connected to the processing unit 113 through an interface 146 such as a serial port interface that couples to the bus 116, although other interfaces such as a parallel port, a game port or a universal serial bus ("USB") can be used. A monitor 148 or other display devices may be coupled to the bus 116 via video interface 150, such as a video adapter. The computing system 112 can include other output devices such as speakers, printers, etc.

The computing system 112 can operate in a networked environment using logical connections to one or more remote computers. The computing system 112 may employ any known means of communications, such as through a local area network ("LAN") 152 or a wide area network ("WAN") or the Internet 154. Such networking environments are well known in enterprise-wide computer networks, intranets, and the Internet.

When used in a LAN networking environment, the computing system 112 is connected to the LAN 152 through an adapter or network interface 156 (communicatively linked to the bus 116). When used in a WAN networking environment, the computing system 112 often includes a modem 157 or other device for establishing communications over the WAN/Internet 154. The modem 157 is shown in FIG. 5 as communicatively linked between the interface 146 and the WAN/Internet 154. In a networked environment, program modules, application programs, or data, or portions thereof, can be stored in a server computer (not shown). Those skilled in the relevant art will readily recognize that the network connections shown in FIG. 5 are only some examples of establishing communication links between computers, and other links may be used, including wireless links.

The computing system 112 may include one or more interfaces to allow the addition of devices either internally or externally to the computing system 112. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processing unit 113 for execution. Such a medium may take many forms, including but not limited to, a computer readable storage medium such as non-volatile media and volatile media, and a non-storage medium such as transmission media. Non-volatile media includes, for example, hard, optical or magnetic disks 125, 130, 132, respectively. Volatile media includes dynamic memory, such as system memory 114. Transmission media includes coaxial cables, copper wire and fiber optics, including the wires that comprise system bus 116. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing unit 113 for execution. For example, the instructions may initially be carried on a magnetic disk of a remote computer. The remote computer can load the instructions into its dynamic memory and send the instructions over a telephone line using a modem. The modem 157 local to computer system 112 can receive the data on the telephone line and use an infrared transmitter to convert the data to an infrared signal. An infrared detector coupled to the system bus 116 can receive the data carried in the infrared signal and place the data on system bus 116. The system bus 116 carries the data to system memory 114, from which processing unit 113 retrieves and executes the instructions. The instructions received by system memory 114 may optionally be stored on storage device either before or after execution by processing unit 113.

Specific to one embodiment of the present invention, the computing system also includes a NAND flash memory 158 that includes the physical blocks and is controlled according to the method discussed above with respect to FIGS. 1-4. The instructions for implementing the method can also be stored in the flash memory 158. The method could be implemented using the main processing unit 113 or a separate processor/controller that could be incorporated within the flash memory device or added to the computer system 112 and coupled to the bus 116.

All of the above U.S. patents, U.S. patent application publications, U.S. patent applications, foreign patents, foreign patent applications and non-patent publications referred to in this specification and/or listed in the Application Data Sheet, including but not limited to U.S. Pat. Nos. 5,740,395; 6,374,324; 5,634,050; 5,930,815; 6,581,132; 6,594,183; 5,867,641; 5,535,369, are incorporated herein by reference, in their entirety.

Without prejudice to the underlying principles of the invention, the details and the embodiments may vary, also appreciably, with reference to what has been described by way of example only, without departing from the scope of the invention as defined by the annexed claims.

What is claimed is:

1. A method of controlling write/erase operations in a memory device, the method comprising:
   dividing the memory device in physical blocks, wherein each physical block is comprised of a number of pages;
   considering the memory device as comprising consecutive virtual blocks, each virtual block including consecutive sectors;
   associating with each virtual block a virtual block number;
   selecting a size of said virtual blocks equal to a multiple of a size of said physical blocks; and
   creating a virtual-to-physical mapping table having entries that each store a pointer to a root node of a tree structure having a number of child nodes, the tree structure linking logically a set of physical blocks in the memory device, the set of physical blocks representing one of said virtual blocks, the root node comprising a physical block number of one of the set of physical blocks used as root, a pointer to a left child node, a pointer to a right child node, and the number of child nodes currently present in said tree structure.

2. The method of claim 1, including the step of managing access to said memory device via said virtual blocks.

3. The method of claim 1, wherein all the physical blocks linked in said tree structure relate to the same virtual block.

4. The method of claim 1, including the steps of:
   arranging said virtual blocks in said memory device in an indexed order, and
   storing in an i-th entry of said mapping table the pointer to the root of said tree structure associated with an i-th virtual block in said memory device.

5. The method of claim 1, including the steps of associating with each physical block indicated in said tree structure a first page with a spare area and storing in said spare area information for linking the blocks that are associated with said tree structure.

6. The method of claim 5 wherein the creating of the virtual-to-physical mapping table includes, during a power on operation of the memory device, reading the spare area of the first page of at least some of said physical blocks to determine each of the tree structures that link logically the set of physical blocks in the memory device.

7. The method of claim 1, including rewrite operations of the same sector in said physical block performed via said virtual blocks without erasing the physical blocks between them.

8. The method of claim 1, including page write operations in the same virtual block generating said tree structure linking different physical blocks in said memory device.

9. The method of claim 1, wherein said tree structure comprises a root node and a plurality of child nodes.

10. The method of claim 9, wherein said tree structure includes a child node comprising:
a physical block number of a physical block corresponding to the child node; and
a pointer to a next child node in said tree structure.

11. The method of claim 10, wherein subsequent write operations of the same sectors in a virtual block generate child nodes.

12. The method of claim 1, including the step of arranging the sectors of said virtual blocks in left child blocks and right child blocks, wherein:
said left child blocks contain rewrites of a first group of sectors of said virtual block; and
the right child blocks contain rewrites of a second group of sectors of said virtual block.

13. The method of claim 1, wherein each physical block belonging to a defined tree structure stores the virtual block number of the virtual block represented by said tree structure.

14. The method of claim 1, including the step of selecting said memory device as a NAND flash memory.

15. The method of claim 1 wherein each of the pages of one of the physical blocks has a swap indicator, the swap indicator of a first one of the pages indicating that data for that page is written to a second one of the pages, and the swap indicator of the second one of the pages indicating that the data for that page is written to the first one of the pages.

16. A method of controlling write/erase operations in a memory device divided into physical blocks, the method comprising:
defining a plurality of virtual blocks that each correspond to a plurality of the physical blocks, each of the plurality of virtual blocks including a plurality of addressable sectors arranged in left child blocks and right child blocks, the left child blocks containing rewrites of a first group of sectors of the virtual block, and the right child blocks containing rewrites of a second group of sectors of the virtual block;
creating a plurality of tree structures, each of the plurality of tree structures respectively corresponding to one of the plurality of virtual blocks and logically linking the physical blocks corresponding to the virtual block of the tree structure to one another;
creating a virtual-to-physical mapping structure having entries that each store a pointer to a root node of a respective one of the tree structures; and
accessing one of the physical blocks via the virtual-to-physical mapping structure and the tree structure of the virtual block corresponding to the accessed physical block.

17. The method of claim 16, further comprising:
arranging the virtual blocks in the memory device in an indexed order; and
storing in an i-th entry of the mapping structure the pointer to the root of the tree structure associated with an i-th virtual block in the memory device.

18. The method of claim 16, wherein the root node of each tree structure includes:
a physical block number of the physical block pointed to by the root node;
a pointer to a left child node;
a pointer to a right child node; and
the number of child nodes currently present in the tree structure.

19. The method of claim 16, wherein each tree structure includes a child node comprising:
a physical block number of a physical block corresponding to the child node; and
a pointer to a next child node in the tree structure.

20. The method of claim 16, wherein each write operation to the same sector in a virtual block generate child nodes in the tree structure of the virtual block.

21. The method of claim 16, wherein each physical block stores a virtual block number that identifies the virtual block to which the physical block corresponds.

22. The method of claim 16 wherein the left child block contains a first and a second rewrite of each of one or more of the first group of sectors of the virtual block, and/or the right child block contains a first and a second rewrite of each of one or more of the second group of sectors of the virtual block.

23. The method of claim 22, further comprising:
creating a new child block of the left child block when no space is available in the left child block for storing additional rewrites;
creating a new child block of the right child block when no space is available in the right child block fir storing additional rewrites.

24. A computer system, comprising:
a memory device divided into physical blocks;
means for defining a plurality of virtual blocks that each correspond to a plurality of the physical blocks, each of the plurality of virtual blocks including a plurality of addressable sectors arranged in left child blocks and right child blocks, the left child blocks containing rewrites of a first group of sectors of the virtual block, and the right child blocks containing rewrites of a second group of sectors of the virtual block;
means for creating a plurality of tree structures, each of the plurality of tree structures respectively corresponding to one of the plurality of virtual blocks, and logically linking the physical blocks corresponding to the virtual block of the tree structure to one another;
means for creating a virtual-to-physical mapping structure having entries that each store a pointer to a root node of a respective one of the tree structures; and
means for accessing one of the physical blocks via the virtual-to-physical mapping structure and the tree structure of the virtual block corresponding to the accessed physical block.

25. The computer system of claim 24, further comprising:
means for arranging the virtual blocks in the memory device in an indexed order, wherein the means for creating the mapping structure stores in an i-th entry of the mapping structure the pointer to the root of the tree structure associated with an i-th virtual block in the memory device.

26. The computer system of claim 24, wherein the root node of each tree structure includes:
a physical block number of the physical block pointed to by the root node;

a pointer to a left child node;

a pointer to a right child node; and the number of child nodes currently present in the tree structure.

27. The computer system of claim 24, wherein each tree structure includes a child node comprising:

a physical block number of a physical block corresponding to the child node; and a pointer to a next child node in the tree structure.

28. The computer system of claim 24, wherein each write operation to the same sector in a virtual block generate child nodes in the tree structure of the virtual block.

29. The computer system of claim 24, wherein each physical block stores a virtual block number that identifies the virtual block to which the physical block corresponds.

30. A computer readable storage medium for controlling write/erase operations in a memory device including memory blocks divided into physical blocks, the computer readable storage medium comprising instruction code portions for performing, when the instruction code portions are run on a computer, the following operations:

defining a plurality of virtual blocks that each correspond to a plurality of the physical blocks;

creating a plurality of tree structures, each of the plurality of tree structures respectively corresponding to one of the plurality of virtual blocks and logically linking the physical blocks corresponding to the virtual block of the tree structure to one another;

creating a virtual-to-physical mapping structure having entries that each store a pointer to a root node of a respective one of the tree structures, the root node comprising a physical block number of the physical block pointed to by the root node, a pointer to a left child node, and a pointer to a right child node; and accessing one of the physical blocks via the virtual-to-physical mapping structure and the tree structure of the virtual block corresponding to the accessed physical block.

31. The computer readable storage medium of claim 30, farther comprising instruction code portions for performing, when the instruction code portions are run on a computer, the following operations:

arranging the virtual blocks in the memory device in an indexed order; and storing in an i-th entry of the mapping structure the pointer to the root of the tree structure associated with an i-th virtual block in the memory device.

32. The computer readable storage medium of claim 30, wherein each tree structure includes a child node comprising:

a physical block number of a physical block corresponding to the child node; and a pointer to a next child node in the tree structure.

33. The computer readable storage medium of claim 30, wherein each virtual block includes a plurality of addressable sectors and each write operation to the same sector in a virtual block generate child nodes in the tree structure of the virtual block.

34. The computer readable storage medium of claim 30, wherein each virtual block includes a plurality of addressable sectors arranged in left child blocks and right child blocks, wherein:

the left child blocks contain rewrites of a first group of sectors of the virtual block; and the right child blocks contain rewrites of a second group of sectors of the virtual block.

35. The computer readable storage medium of claim 30, wherein each physical block stores a virtual block number that identifies the virtual block to which the physical block corresponds.

* * * * *